United States Patent
Baniassadi

(10) Patent No.: US 10,617,971 B2
(45) Date of Patent: Apr. 14, 2020

(54) DIRECT FIRED EVAPORATOR AND METHOD FOR USE THEREOF

(71) Applicant: ENHANCED EQUIPMENT LLC, Chicago, IL (US)

(72) Inventor: Mohammad Hossein Baniassadi, Chicago, IL (US)

(73) Assignee: ENHANCED EQUIPMENT LLC, Chicago, IL (US)

( * ) Notice: Subject to any disclaimer, the term of this patent is extended or adjusted under 35 U.S.C. 154(b) by 0 days.

(21) Appl. No.: 16/079,573

(22) PCT Filed: Feb. 24, 2017

(86) PCT No.: PCT/US2017/019238
§ 371 (c)(1),
(2) Date: Aug. 24, 2018

(87) PCT Pub. No.: WO2017/147351
PCT Pub. Date: Aug. 31, 2017

(65) Prior Publication Data
US 2019/0054391 A1 Feb. 21, 2019

Related U.S. Application Data

(60) Provisional application No. 62/300,204, filed on Feb. 26, 2016.

(51) Int. Cl.
*B01D 1/26* (2006.01)
*B01D 5/00* (2006.01)
(Continued)

(52) U.S. Cl.
CPC .............. *B01D 1/26* (2013.01); *B01D 1/0058* (2013.01); *B01D 1/08* (2013.01); *B01D 5/006* (2013.01)

(58) Field of Classification Search
CPC .......... B01D 1/0058; B01D 1/08; B01D 1/26; B01D 5/006
See application file for complete search history.

(56) References Cited

U.S. PATENT DOCUMENTS 4,448,136 A   5/1984   White
4,548,048 A   10/1985  Reimann et al.
(Continued)

OTHER PUBLICATIONS

Incropera, F.P. et al. (1996) Fundamentals of Heat and Mass Transfer, Wiley, 886 pgs [Office action cites pp. 586, 600, & 603].*
(Continued)

*Primary Examiner* — Brian A Mccaig
(74) *Attorney, Agent, or Firm* — Leydig, Voit & Mayer, Ltd.

(57) ABSTRACT

A direct-fired evaporator includes a closed vessel into which a slurry feed of a slurry is provided. The vessel includes an outlet for concentrated product and an outlet for solvent vapor. A furnace extends through the vessel under a level of the slurry. A burner is positioned at an entrance to an interior of the furnace. An agitator is disposed in the vessel so as to agitate the slurry around an outer wall of the furnace. Flue gases from combustion are used as a heat-transfer medium for evaporating the slurry. The direct-fired evaporator can be used as a first effect in a multi-effect evaporation system.

18 Claims, 4 Drawing Sheets

(51) Int. Cl.
  *B01D 1/00*  (2006.01)
  *B01D 1/08*  (2006.01)

(56) References Cited

U.S. PATENT DOCUMENTS

| | | |
|---|---|---|
| 5,645,693 A | 7/1997 | Gode |
| 6,044,803 A | 4/2000 | Hamos et al. |
| 7,669,349 B1 * | 3/2010 | Palmer .................... F26B 11/16 210/770 |
| 8,631,769 B1 | 1/2014 | Kirakossian |

OTHER PUBLICATIONS

Schilling, R.L. et al. (2008) "Chapter 11 Heat Transfer Equipment" in Perry's Chemical Engineers' Handbook, 8th edition, McGraw-Hill, 26 pgs.*
Nicholas P. Cheremisinoff, "Handbook of Chemical Processing Equipment", Dec. 2000, pp. 1-558.
Paul E. Minton, "Handbook of Evaporation Technology", Dec. 1986, pp. 1-418.

* cited by examiner

US 10,617,971 B2

DIRECT FIRED EVAPORATOR AND METHOD FOR USE THEREOF

CROSS-REFERENCE TO PRIOR APPLICATIONS

This application is a U.S. National Phase Application under 35 U.S.C. § 371 of International Application No. PCT/US2017/019238, filed on Feb. 24, 2017, and claims benefit to U.S. Provisional Patent Application No. 62/300,204 filed on Feb. 26, 2016, the entire disclosure of which is hereby incorporated by reference herein. The International Application was published in English on Aug. 31, 2017 as WO 2017/147351 under PCT Article 21(2).

FIELD

The invention relates to an evaporator and to a method of using the evaporator, in particular, as a first effect in a multi-effect evaporation system. Such evaporators operate on a solution or slurry and removes solvent as a vapor, typically in order to concentrate the solution or slurry or crystallizing solids out of a liquid. The concentrated solution or slurry and crystallized solids are typically the desired product, while the vapor is typically not a desired product. As used herein, "slurry" refers to the liquid product to be evaporated or concentrated and includes liquids which include water within their composition (e.g., liquids for which water is to be removed as vapor), but is not to be understood as being itself water.

BACKGROUND

Evaporators are used in a wide range of industries, such as Chemical, Mining, Food, Pharmaceuticals, etc. and are among the most expensive process units used in these industries. Evaporation of slurry requires massive amounts of energy in comparison to simple heating of the same slurry. Accordingly, the majority of evaporators are energy intensive. By some estimates, 25% of the total energy consumption of a plant takes place inside evaporators. While evaporators operating with electricity or hot water do exist in very limited numbers in some industries, by far the majority of evaporators operate with steam that has been generated by a steam generator.

In particular, most manufacturing plants utilize steam in a number of processes, including evaporation in particular. Therefore, most manufacturing plants utilize, typically, a number of steam generators, for example, housed in one area of the plant, which operate as a sort of "Utility Process Unit" to supply steam to the different manufacturing processes throughout the plant. Often, the steam can be used relatively efficiently in different process or stages depending on various temperature requirements of different processes. Additionally, it is typical for other processes of a plant to produce steam as waste heat, which can be combined and used with the steam generated by the steam generators. Moreover, because most manufacturing plants utilize water for a number of processes, water is typically available for the steam generators.

Cheremisinoff, "Handbook of Chemical Processing Equipment," describes the prevalent use of steam and demonstrates that the assumption that steam should be used for evaporation systems (see, e.g., p. 95 in which evaporators are first classified into two main categories, "Steam Inside Tube" and "Steam Outside Tube").

Minton, Paul E., "Handbook of Evaporation Technology," Noyes Publications, Westwood, N.J., pp. 1-402 (1986) describes types of evaporators and applications. A number of challenges are discussed, including the problems of scaling (or crystallization on the metal surfaces of the heat-transfer tube of the evaporator), salting and fouling, which can especially occur in multi-effect evaporations systems and require shut-down of the evaporation process unit for cleaning or to replace the heat exchange tubes thereof. One reason that evaporators used in multiple-effect evaporation systems are more prone to scaling is because such evaporation systems typically operate with liquids higher in scale forming content. The use of energy-intensive forced circulation and agitation in short tube-type evaporators are some of the measures used to reduce the problem of scaling. The agitator in such an evaporator acts as a pump to circulate the flow inside the heat exchange tubes through which the slurry is provided. However, the major of circulation in such evaporators has roots in the change of feed density. Due to the size and a high number of tubes used to create a greater heat-exchange surface and limits on the impeller size and speed, agitation is not very effective. With the exception of tanks with steam coils agitation in other types of evaporators cannot be applied since the heat exchangers are of a shell and tube design allowing for no agitator installation. As a result, preventing evaporator scaling has been an ongoing challenge across many industries.

SUMMARY

In an embodiment, the present invention provides a direct-fired evaporator includes a closed vessel into which a slurry feed of a slurry is provided. The vessel includes an outlet for concentrated product and an outlet for solvent vapor. A furnace extends through the vessel under a level of the slurry. A burner is positioned at an entrance to an interior of the furnace. An agitator is disposed in the vessel so as to agitate the slurry around an outer wall of the furnace. Flue gases from combustion are used as a heat-transfer medium for evaporating the slurry. The furnace can also be connected a tube bundle and/or a flue gas chamber for further transfer of heat from the flue gases before the flue gases are exhausted. In one embodiment, the direct-fired evaporator is used as a first effect in a multi-effect evaporation system.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
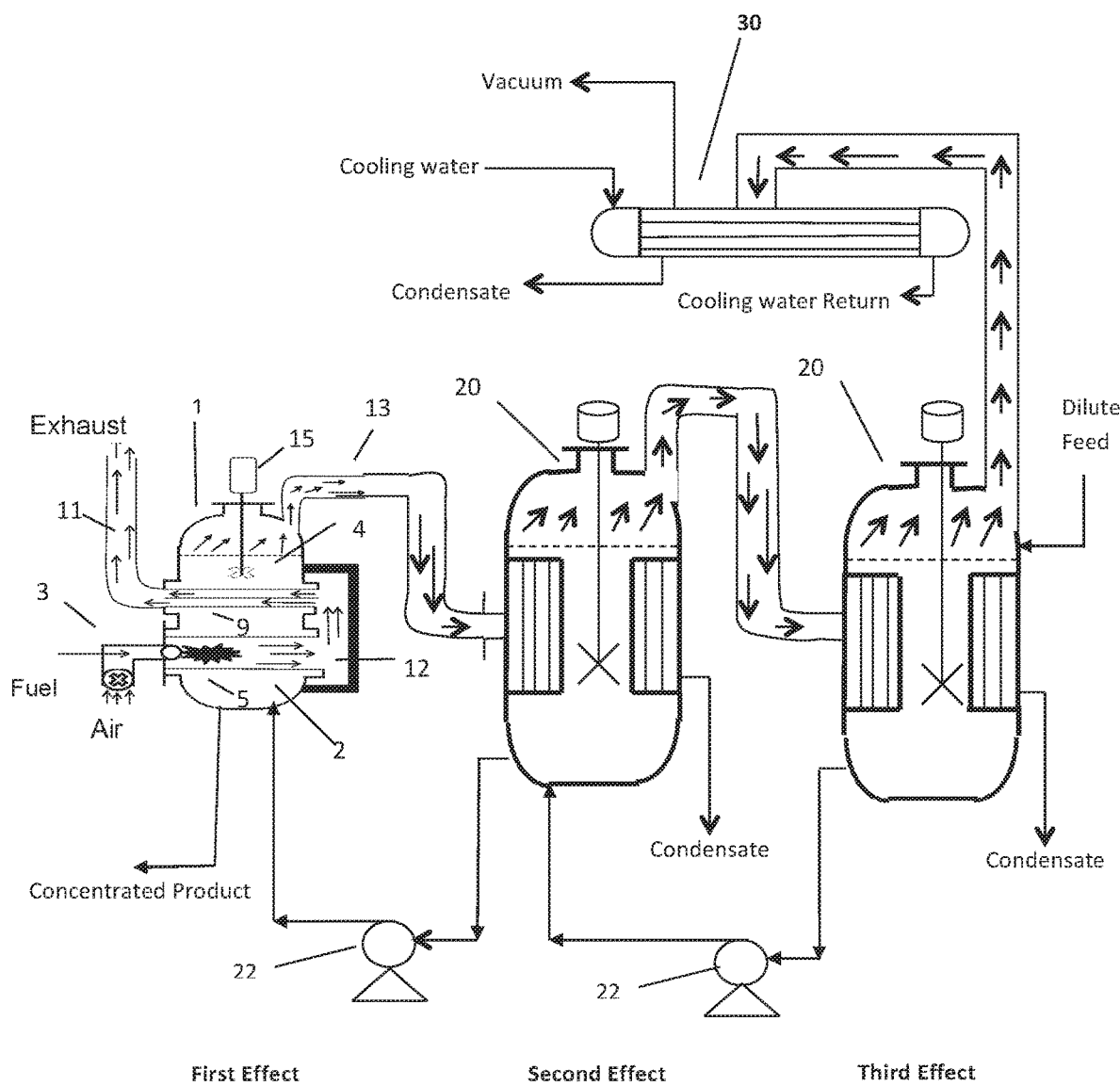
FIG. 1 is a schematic view of a multi-effect evaporation system utilizing a direct-fired evaporator as the first effect in accordance with an embodiment of the present invention.

Embodiments of the present invention provide a method, device and system which are able to surprisingly achieve more efficient operation than typical steam generators and reduced carbon emissions, while at the same time surprisingly being more effective against scaling, despite expectations to the contrary. Additionally, the inventive use of a direct-fired evaporator results in greater flexibility and reduced plant and operation costs, for example, because the heat-transfer medium for the evaporator (e.g., the first effect of a multi-effect evaporation system) is generated directly at the evaporator itself.

As discussed above, scaling has been an ongoing challenge in evaporation systems, especially multi-effect evaporation systems. The driving force for any heat exchange is the temperature differential across a heat-exchange wall. As the slurry side temperature is higher, surface evaporation can occur at the heat-exchange wall (e.g., outer surface of tubes) and promote surface scaling and salting. Additionally, such surface evaporation can also create a vapor blanket around the tubes that results in a significantly lower heat transfer rate to the bulk slurry. In addition, if the feed is temperature sensitive, heating to higher temperatures may result in undesirable changes in the feed property. Accordingly, for these reasons, there was an expectation that using hot flue gases from combustion as the heat-transfer medium at a heat-exchange wall in contact with the slurry would cause excessive scaling/salting, have a lower heat transfer rate and possibly effect temperature-sensitive slurries.

Despite these expectations, it was surprising found that by a design of a direct-fired evaporator in accordance with embodiments of the present invention, scaling is not an issue and the same heat transfer rates as with steam boilers can be achieved. Additionally, by receiving the bulk of the slurry in a vessel of the evaporator equipped with an appropriate agitator and arrangement of the furnace/tubes, not only is the scaling effectively prevented, but temperature-sensitive slurries are less affected as well. The agitation possible by such an arrangement is effective to generate adequate turbulence to reduce or eliminate surface evaporation and over-heating at the heat-transfer wall boundary. Moreover, using the direct-fired evaporator according to embodiments of the present invention, alone or in a multi-effect evaporation system, less energy per unit of evaporation is achieved compared to an evaporation system operating with steam.

According to an embodiment, the present invention provides a multi-effect evaporation system that requires no steam to operate, is energy efficient, cost effective and provides a direct-fired evaporator as a first effect that can be used as a replacement for part of multi-effect evaporation systems that operate with steam. A fossil fuel is burned in the evaporator of the first effect and the released heat is indirectly used via the wall of a furnace (preferably connected to a tube bundle) to evaporate the slurry and thereby produce solvent vapor. The solvent vapor from the first effect of the direct-fired evaporator is then used as the heat-transfer medium in the subsequent effect. In particular, the fossil fuel is mixed with air inside a high-intensity forced burner and is then burnt inside a tubular steel furnace producing flue gases. The flue gases are then preferably passed through the inside of heat-exchange tube bundles (also known as convection tubes) which extend through the vessel of the direct-fired evaporator where the slurry is received before being released to the atmosphere. Preferably, both the furnace and the convection tubes are installed below the operating liquid level of the feed and each have heat-transfer walls to the slurry in the vessel. In addition, if desired, the solvent vapor in the direct-fired evaporator can be produced under vacuum. Moreover, the direct-fired evaporator can be used as the first effect with existing and newly built evaporation systems of a variety of types such as but not limited to forced circulation, short tube, long tube, falling film, etc. Per unit of evaporation, the use of the direct-fired evaporator has been found to also reduce the amount of energy and subsequently carbon emissions compared to an evaporator using steam by more than 10%.

FIG. 1 shows a multi-effect evaporation system in which, in contrast to known multi-effect evaporation systems, the three evaporating effects are not of the same type of evaporators. Rather, the first effect is a direct-fired evaporator 1 in accordance with an embodiment of the invention, while, for example, the second and third effects are short tube-type evaporators 20 which utilize vapor recovered from the prior effect as the heat-transfer medium in tube bundles. Other types of evaporators can also be used for the second and any further effects, such as forced circulation, falling film, long tube, with and without agitator, etc. There is no steam connection or steam supply to this multi-effect evaporation system, as is customary with all multi-effect evaporators. Rather, the first effect is equipped with a burner 3 in which air and fuel are intensively mixed and then burned inside a tubular furnace 5 which extends through the vessel 2 of the direct-fired evaporator 1. A major portion of the heat released by combustion is passed to the tubular wall of the furnace 5 by radiation and convection followed by conduction through the wall of the furnace 5 to the surrounding slurry 4 contained in the vessel 2. The hot flue gases are directed through channel 12 into a bundle of convection tubes 9 which also extend through the vessel 2 such that they are also surrounded by the slurry 4. Accordingly, further heat transfer from the hot flue gases in the tubes 9 to the surrounding slurry 4 takes place prior to the flue gases exiting via exhaust to atmosphere (or to be cleaned, if necessary) through exhaust conduit 11.

The solvent vapor is directed to the second effect via channel 13, and solvent vapor from the second effect is directed to the third effect, and so on depending on the desired number of effects. The slurry feed enters the third, or last, effect and the concentrated product exits through the first effect. The slurry feed is transferred between the effects, e.g., using pumps 22. The operation of the evaporators 20 of the second and third effects and the related condenser 30 and vacuum exertion on the system can be similar to that of existing multi-effect evaporators. Also, the direct-fired evaporator 1 can be operated under vacuum, or at or above atmospheric pressure, depending on the application. This advantageously provides for the direct-fired evaporator 1 to be adapted well to existing systems while providing the benefits discussed herein. Moreover, because the direct-fired evaporator 1 has its own direct heat-transfer source of the combustion and hot flue gases, and is independent of a steam supply system which usually includes numerous components and concurrent inter-connected cycles of devices using the steam, the first effect can be maintained under operation while the other effects are down for cleaning purposes.

An agitator 15, which is preferably top-entry, vigorously agitates the slurry 4 around furnace 5 and a convection tube bundle 9. Because the slurry 4 is contained in the vessel 2 which is relatively much larger than the net volume occupied by the furnace 5 and the tube bundle 9, there is greater freedom to provide larger impellers and higher agitation speeds.

In comparison to an evaporator operated with steam, the direct-fired evaporator 1 produces significantly higher temperature gradients because the hot flue gas is typically about ten times hotter than steam (e.g., about 1500° C. at entrance and less than 200° C. at exit). As discussed above, due to this higher temperature gradient, which was generally viewed as not desirable also because it was thought to create problems, e.g., scaling, over-heating of temperature sensitive slurries, etc., there was no expectation that the direct-fired evaporator 1 would work effectively. Contributing to this belief was the fact that the flue gas has a much lower heat-transfer coefficient than steam such that necessary heat-transfer rates could not be achieved. Surprisingly, however, through the inventive design discussed herein, it was discovered that the combination of the higher temperature gradient and lower heat-transfer coefficient was able to achieve about the same heat-transfer rate, while at the same time avoiding the problems of scaling/salting and over-heating. In fact, as demonstrated by the operation of a prototype discussed below, under conditions intentionally created to pose a risk to scaling over an extended period of operation, no scaling was observed in the direct-fired evaporator 1, while some scaling was observed on the other evaporators of the known short-tube-type as the second and third effects. It is believed that arrangement of the agitator 15 in the slurry 4 of the vessel 2 surrounding the furnace 5 and/or the tube bundle 9 and allowing the freedom to use larger impellers and higher agitation speeds was a contributing factor in achieving these results, which were nevertheless surprising. However, as indicated by the operation of the prototype discussed below, it is also believed that the higher temperature gradient, opposite to what was expected, also contributed significantly in achieving the improved and surprising results. In particular, despite agitation, the second and third effects suffered from scaling during operation of the prototype.

Figure 2:
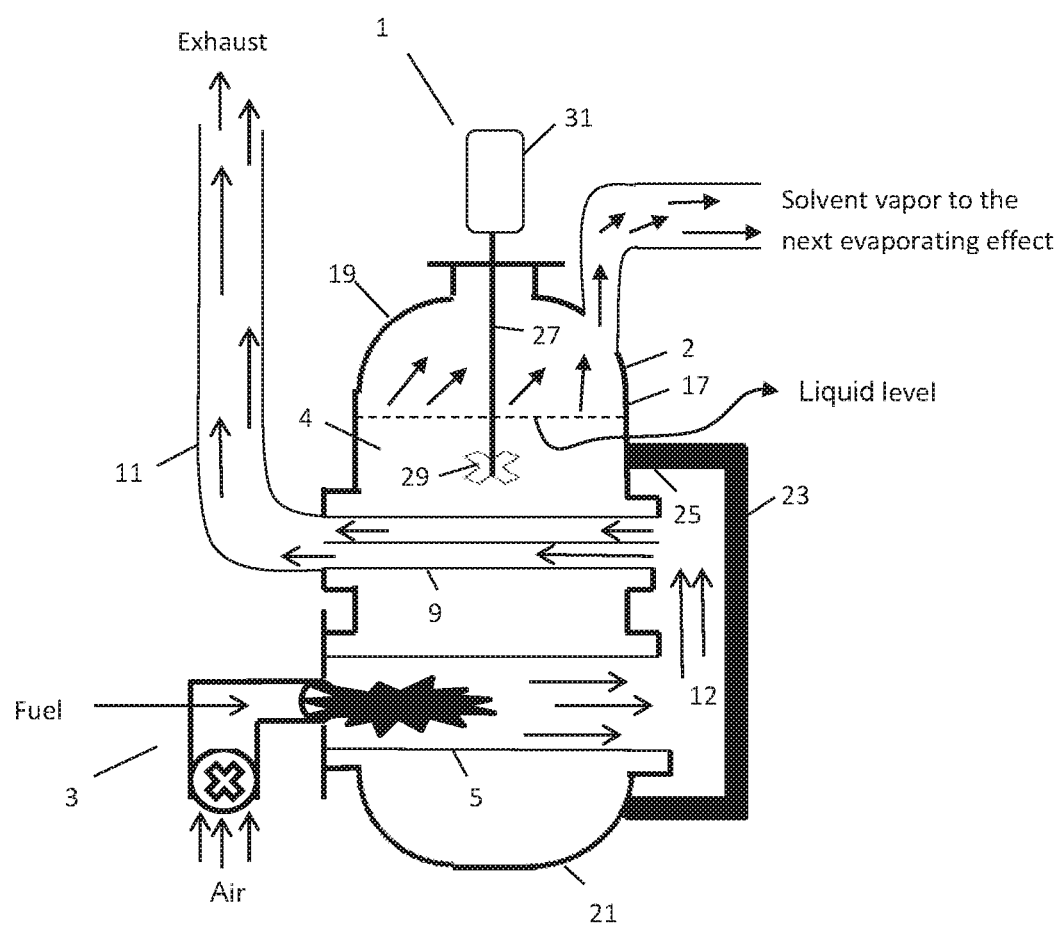
FIG. 2 is a schematic view showing further details of the direct-fired evaporator.

FIG. 2 is a more detailed, schematic view of the direct-fired evaporator 1. It includes a closed vessel preferably of cylindrical shape comprised of shell 17, top cover 19 and bottom cover 21. It is filled to above the tube bundle 9 with the slurry 4 that is to be concentrated. The tubular furnace 5 and tube bundle 9 are both passed through shell 17 and well sealed at both ends. The furnace 5 is connected to the burner 3 at one end and to the closed cavity of a flue gas chamber 12 at the other end. In this embodiment, the flue gas chamber 12 is positioned at the side of the vessel 2 which advantageously provides for further heat transfer through the side wall of the vessel 2, however, other arrangements are also possible. For example, the furnace 5 could have a transition into tube bundle 9, for example through vertical tubes submerged below the slurry level, and/or could of be different shapes/take different paths within the vessel 2, or the flue gas chamber 12 could be positioned inside the vessel 2 The tube bundle 9 connects the flue gas chamber 12 to the stack 11. Inside the burner 3, the fuel and air are mixed and then burned at the tip of the burner which preferably extends inside the furnace 5 in the the vessel 2 producing light and hot gases. The transfer of heat inside the furnace 5 is through both radiation supplied by the intense light of the flame and flue gases and convection supplied by flow of hot flue gases. Convection is the only means of heat transfer inside tubes 9. The flue gas chamber 12 is a closed cavity that has an external metal wall 23 and internal refractory lining 25 of appropriate thickness. To equally distribute the heat, avoid surface evaporation, minimize the deposition of salt and scale on the furnace 5 and tubes of the tube bundle 9, the agitator 15 is applied comprising a shaft 27, impeller 29 and a motor/gearbox 31. The agitator shaft 27 is well sealed by mechanical packing or sealing at the point of entry into the vessel 2 so leakage of air or vapor in between inside the vessel 2 and atmosphere is minimized. Depending on the application, the impeller 29 could be of various known blade types, such as pitched turbine, radial, axial blades, etc. It has been found that a ratio of the diameter of the impeller 29 to the diameter of the vessel 2 in a range of 0.3 to 0.8 is especially advantageous. As discussed above, the design of the direct-fired evaporator 1 allows, preferably, for use of the larger end of this ratio (e.g., 0.5-0.8) which in turn allows for a decrease in the speed of the impeller 29, thereby reducing the power consumption by motor 31. For a uniform and steady pattern of flow about furnace 5 and/or tube bundle 9, the vessel 2 is preferred not equipped with baffles on an internal side of the shell 17. However, in some applications, use of baffles is necessary for attaining uniformity of heat distribution within the slurry 4.

Figure 3:
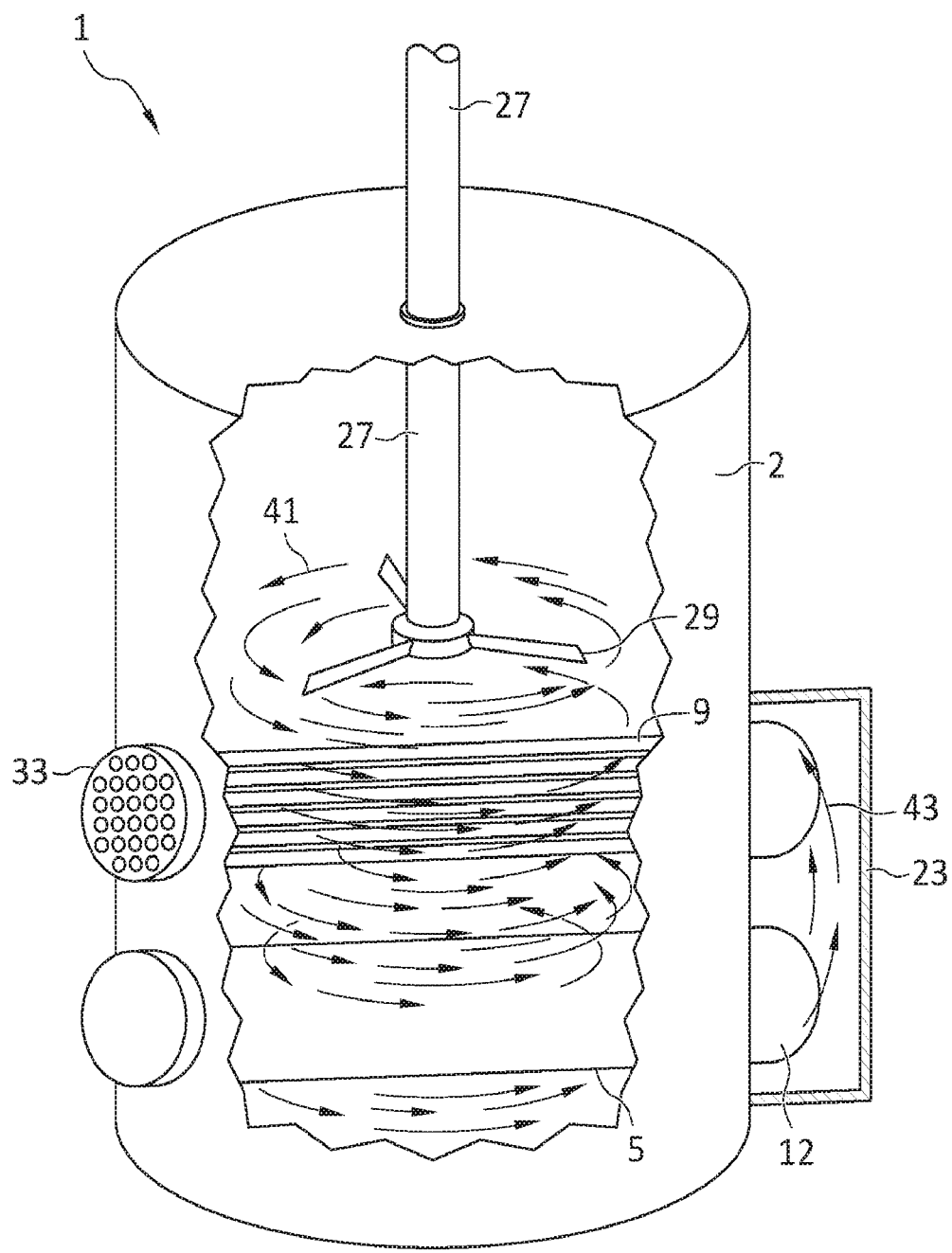
FIG. 3 is a perspective view of the direct-fired evaporator with a view through the wall of the vessel and without the burner, exhaust and feed lines showing flow of slurry caused by agitation in the direct-fired evaporator.

FIG. 3 shows further details of an exemplary agitator 15, and the flow of slurry 41 provided thereby around an exemplary tube bundle 9 and furnace 5 inside the vessel 2. In the example shown, the hot flue gases created by combustion flow through the furnace 5 and take a U-shaped path 43 through the flue gas chamber 12 and into the tube bundle 9. In an alternative embodiment, a vertical tube could sealingly pass through the furnace 5 in order for the shaft 27 to pass therethrough such that the impeller 29 can be positioned in the vessel 2 below the furnace. As further alternatives one or more side-entry agitators or a bottom entry agitator could be used. As an even further alternative, the shaft 27 could be attached to multiple impellers at different locations within the vessel 2. In the example shown, the tubes of the tube bundle 9 are connected at each end to a tube sheet 33.

Figure 4:
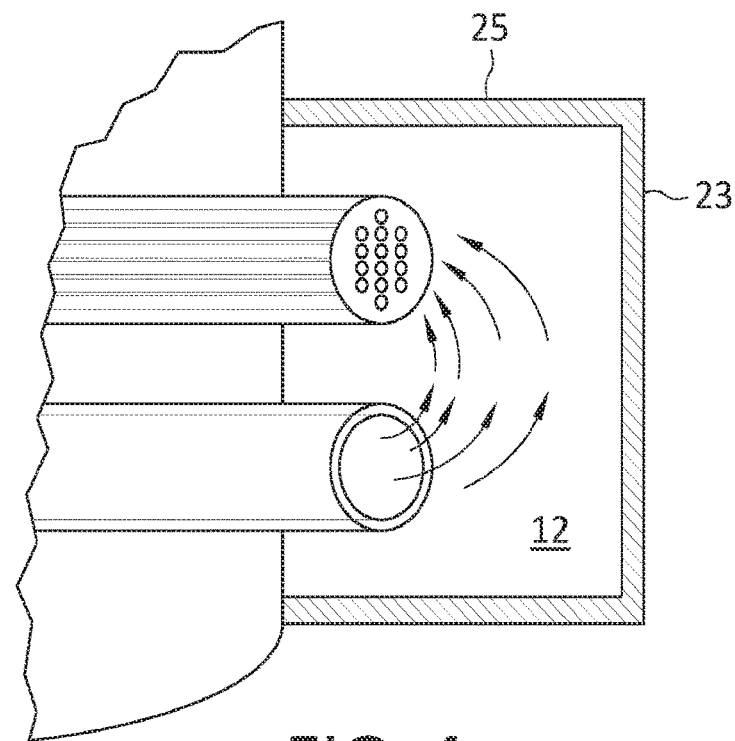
FIG. 4 is a schematic view of a possible flue gas chamber of the direct-fired evaporator.

FIG. 4 shows further details of an exemplary flue gas chamber and the flow of hot flue gases therein. Preferably, the high-intensity light from the flame is also reflected somewhat by the lining 25 the wall 23 so that further heat transfer by radiation is provided. The tube sheet 33 is provided on at least this end of the tubes of the tube bundle 9.

Figure 5:
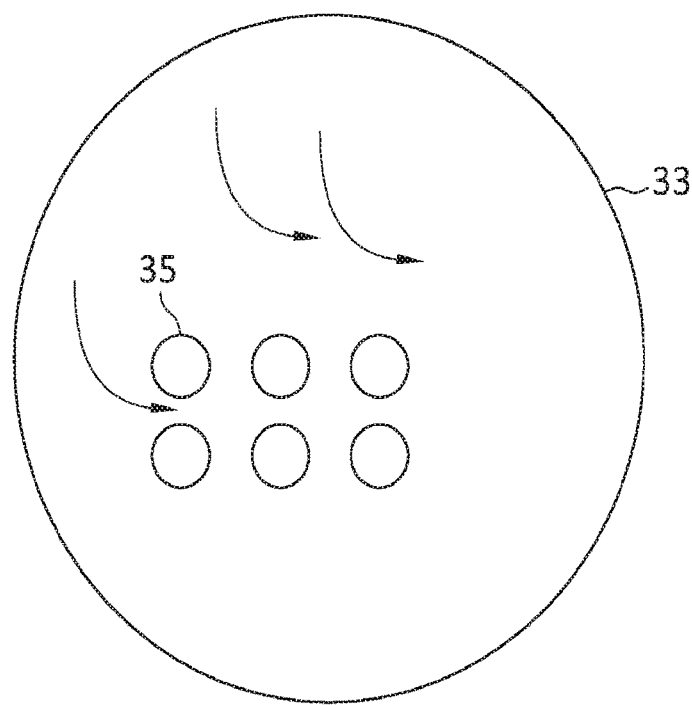
FIG. 5 is a schematic view of a possible tube sheet for convection tubes of the direct-fired evaporator.

FIG. 5 shows the exemplary tube sheet 33 which is a solid sheet of metal material with holes corresponding to the entrance into the tubes 35 of the tube bundle 9. The spacing and orientation among the tubes 35 is selected to provide for easy passage of the slurry 4 around the tubes 35 and scaling minimization, while maximizing heat distribution. In the example shown, the tubes 35 are in a rectangular pattern, though a triangular pattern could also be used to allow more tubes 35 to be inserted per unit area.

Embodiments of the method and system described herein can be used for evaporation/crystallization.

Example

A prototype of the embodiment of the invention as illustrated in FIGS. 1-5 was constructed with following specifications:
Heat Transfer Area: 160 ft$^2$
Furnace ID: 20 inches
Convection Tube Outer Diameter: 1.89 inches
Center-to-Center Tube Spacing: 3.0 inches
Burner Capacity: 1,500,000 Btu/hr
First Effect Operating Pressure: 11.8 psia
Second Effect Operating Pressure: 8.3 psia Third Effect Operating Pressure: 3.5 psia
Mixer Orientation: Top entry
Mixer Speed: 48 rpm
Mixer Pumping Capacity: 15,000 Gallon per minute
Mixer Blend Time: 42 seconds No baffles were included. The prototype was coupled with second and third effects with evaporators of the short tube-type equipped with agitators in accordance with FIG. 1. The direct-fired evaporator was used to concentrate a caustic soda solution from 10 to 25% over the course of a few months. The caustic soda solution was deliberately contaminated with alumina and residual amount of silica in the form of sodium silicate and sodium aluminate. The concentration of the caustic solution is modeled after the range of the concentration of feed to evaporators used in the famous Bayer Alumina Process. The entire testing prototype was a closed loop in which the condensate from all effects was collected and remixed to make the feed to the third effect. Interim make-up of silica and alumina was made as these ions were depleted from the system by the scaling process. Over the course of operation, surprisingly, no scaling was observed on the outer walls of the furnace or convection tubes of the direct-fired evaporator, while the second and third effects of the short tube-type, despite agitation, continuously suffered from sodium alumina silicate scales in the form of sodalite and concrinite.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A direct-fired evaporator, comprising:
    a closed vessel into which a slurry feed of a slurry is provided, the vessel including an outlet for concentrated product and an outlet for solvent vapor;
    a furnace extending through the vessel under a level of the slurry;
    a burner positioned at an entrance to an interior of the furnace; and
    a top-entry agitator disposed in the vessel so as to agitate the slurry around an outer wall of the furnace.

2. The direct-fired evaporator according to claim 1, further comprising a tube bundle extending through the vessel under the level of slurry.

3. The direct-fired evaporator according to claim 2, further comprising a flue gas chamber connecting the interior of the furnace to interiors of tubes of the tube bundle.

4. The direct-fired evaporator according to claim 3, wherein the furnace and the tube bundle each extend horizontally through the vessel, and wherein the flue gas chamber extends vertically along a side wall of the vessel.

5. The direct-fired evaporator according to claim 3, further comprising a tube plate positioned in the flue gas chamber and having holes opening into the interiors of the tubes of the tube bundle, the tubes each being connected at a first end thereof to the tube plate.

6. The direct-fired evaporator according to claim 5, wherein the tubes each open up at second end thereof, opposite to the first end, into an exhaust conduit.

7. The direct-fired evaporator according to claim 1, wherein the agitator includes an impeller having an outer diameter, and wherein a ratio of the outer diameter of the impeller to an outer diameter of the vessel is in a range from 0.3 to 0.8.

8. A method for evaporating a slurry, comprising:
    providing a slurry feed of a slurry to a closed vessel of a direct-fired evaporator having a burner and a furnace that runs through the vessel to an exhaust;
    agitating the slurry around an outer wall of the furnace using an agitator, wherein the agitator is a top-entry agitator and/or wherein a ratio of an outer diameter of an impeller of the agitator to an outer diameter of the vessel is in a range from 0.3 to 0.8; and
    evaporating the slurry in the vessel using flue gases that flow through the furnace as a heat-transfer medium to form a solvent vapor.

9. The method according to claim 8, wherein the evaporating is performed as a first effect in a multi-effect evaporation system.

10. The method according to claim 9, further comprising providing at least one additional evaporator as a second effect which uses the solvent vapor from the direct-fired evaporator as the first effect as a heat-transfer medium to the slurry for partial evaporation prior to the slurry being fed into the direct-fired evaporator for further evaporation as the first effect.

11. The method according to claim 10, further comprising providing at least one further evaporator as a third effect which uses solvent vapor from the second effect as a heat-transfer medium to the slurry for partial evaporation prior to the slurry being fed into the at least one additional evaporator as the second effect.

12. The method according to claim 8, wherein the burner is positioned at an entrance to an interior of the furnace inside the evaporator such that combustion of fuel and air heats an inner wall of the furnace by heat of radiation and convection by the flue gases flowing through the interior of the furnace which, in turn, provide for the evaporating of the slurry by conduction and convection through an outer wall of the furnace to the slurry contained in the evaporator and surrounding the outer wall of the furnace.

13. The method according to claim 12, wherein the flue gases flow from the furnace into a tube bundle which extends through the evaporation and into an exhaust conduit to provide further heat transfer using the flue gases.

14. The method according to claim 13, wherein the furnace and the tube bundle are connected to each other by a flue gas chamber positioned along an outside wall of the evaporator.

15. The method according to claim 8, wherein the agitator is a top-entry agitator.

16. The method according to claim 8, wherein the ratio of the outer diameter of the impeller to the outer diameter of the vessel is in a range from 0.3 to 0.8.

17. A direct-fired evaporator, comprising:
 a closed vessel into which a slurry feed of a slurry is provided, the vessel including an outlet for concentrated product and an outlet for solvent vapor;
 a furnace extending through the vessel under a level of the slurry;
 a burner positioned at an entrance to an interior of the furnace; and
 an agitator disposed in the vessel so as to agitate the slurry around an outer wall of the furnace, wherein the agitator includes an impeller having an outer diameter, and wherein a ratio of the outer diameter of the impeller to an outer diameter of the vessel is in a range from 0.3 to 0.8.

18. The direct-fired evaporator according to claim 17, wherein the ratio of the outer diameter of the impeller to the outer diameter of the vessel is in a range from 0.5 to 0.8.

\* \* \* \* \*